United States Patent [19]
Frankenberger

[11] Patent Number: 5,565,093
[45] Date of Patent: Oct. 15, 1996

[54] CONVEYOR-BAND FILTER APPARATUS

[76] Inventor: Dieter Frankenberger, Vor dem Hohen Stein 1, D-35415 Pohlheim, Germany

[21] Appl. No.: 417,603

[22] Filed: Apr. 6, 1995

[30] Foreign Application Priority Data

Apr. 8, 1994 [EP] European Pat. Off. ............ 94105447

[51] Int. Cl.$^6$ ................................................ B01D 33/333
[52] U.S. Cl. ......................................... 210/158; 210/160
[58] Field of Search ..................................... 210/155, 158, 210/159, 160, 161

[56] References Cited

U.S. PATENT DOCUMENTS

| | | | |
|---|---|---|---|
| 1,514,673 | 11/1924 | Roddy | 210/160 |
| 1,732,649 | 10/1929 | Hobart | 210/160 |
| 1,856,381 | 5/1932 | Gary | 210/160 |
| 2,307,601 | 1/1943 | Nichols | 210/176 |
| 2,671,563 | 3/1954 | Benner, Jr. | 210/176 |
| 3,093,578 | 6/1963 | Hofmeister | 210/160 |
| 3,802,565 | 4/1974 | Hughes et al. | 210/160 |
| 3,856,678 | 12/1974 | Hagihara | 210/160 |
| 4,188,294 | 2/1980 | Hagihara | 210/400 |
| 4,597,864 | 7/1986 | Weisemann | 210/160 |
| 5,059,313 | 10/1991 | Etschel et al. | 210/155 |
| 5,387,336 | 2/1995 | Bormet et al. | 210/158 |
| 5,387,337 | 2/1995 | Byers | 210/159 |

FOREIGN PATENT DOCUMENTS

| | | |
|---|---|---|
| 0291574 | 11/1988 | European Pat. Off. . |
| 0480075 | 4/1992 | European Pat. Off. ............... 210/155 |
| 163182 | 10/1904 | Germany . |
| 3004961 | 8/1981 | Germany . |
| 4200366 | 7/1993 | Germany . |
| 101821 | 7/1922 | Switzerland . |
| 2045634 | 11/1980 | United Kingdom ................... 210/159 |

*Primary Examiner*—Peter A. Hruskoci
*Assistant Examiner*—Theodore M. Green
*Attorney, Agent, or Firm*—Flynn, Thiel, Boutell & Tanis, P.C.

[57] ABSTRACT

Conveyor-band filter apparatuses, so-called Paternoster filter rakes, which serve primarily for the mechanical cleansing of flowing sewage, are to be made capable by the invention of removing not only the normal filtered material, but also coarser fragments, from the conduit through which the sewage flows, without the usually steep conveying angle having to be varied; for this purpose, filter elements of the endless filter band are arranged in each case on the chain links and are designed on their end faces in such a way that only a small gap remains even in the state in which they are mutually pivoted relative to one another. Furthermore, attached to the filter elements are filter rakes forming a horizontal lifting face which extends transversely through the conduit and which can nevertheless be kept clean by corresponding stripping devices.

23 Claims, 3 Drawing Sheets

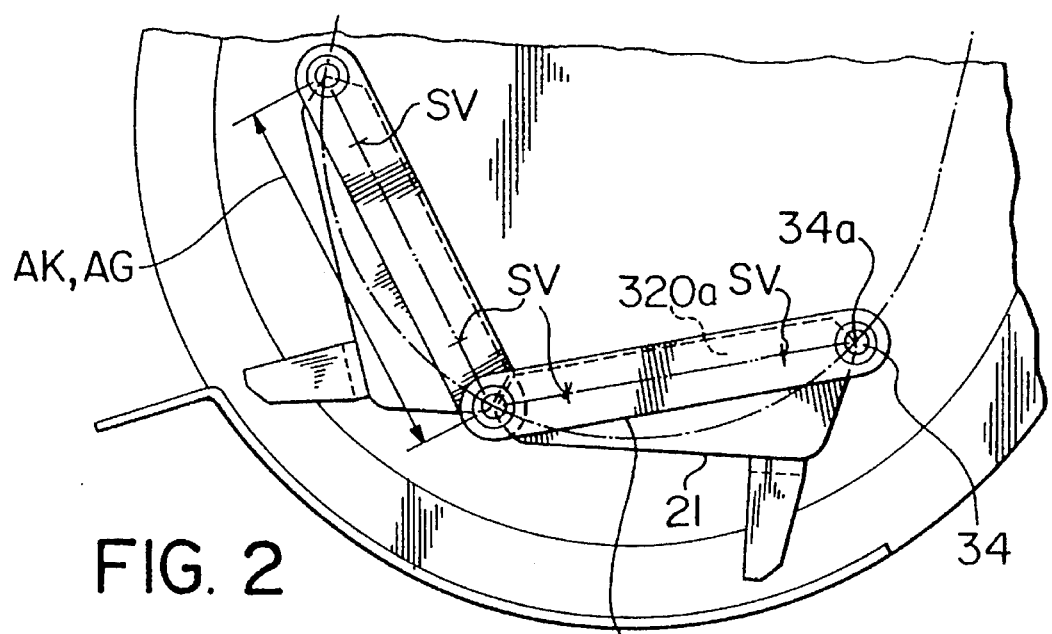
FIG. 2
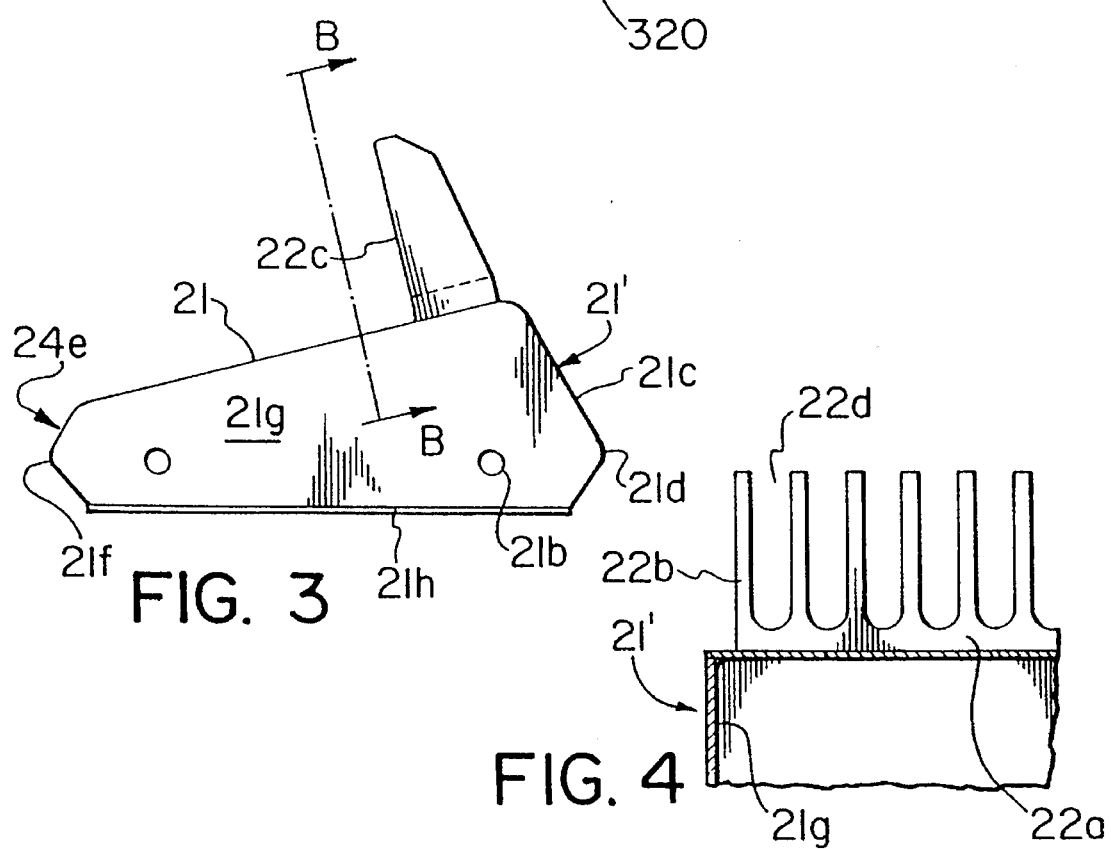
FIG. 3
FIG. 4

CONVEYOR-BAND FILTER APPARATUS

FIELD OF THE INVENTION

The invention relates to a conveyor-band filter apparatus for the mechanical cleansing of a liquid flowing in a conduit or the like and contaminated with solids, with an endless filter band consisting of interconnected sheet-like filter elements each displaceable relative to the other about a horizontal axis of articulation, in each case a flexible drive means provided on both sides of the filter band, for example a chain drive with deflecting elements and with two endless drive chains, to which the filter elements are fastened laterally, and a frame mount which carries the deflecting elements and the filter band, the frame mount having an upper mount part which remains outside the conduit and to which at least one drive motor for the drive means is fastened and in the region of which the filtration material is discharged.

BACKGROUND OF THE INVENTION

A conveyor-band filter apparatus of this type is already known from patent specification EP 0 291 574 B1. Conveyor-band filter apparatuses of this type, so-called Paternoster filter rakes, serve primarily for the mechanical cleansing of flowing sewage in corresponding conduits, the mount lower part of the frame mount, mostly arranged at an inclination during operation, being introduced into a conduit of this kind. The sewage flows through the filter elements which discharge the filtered material, incapable of passing through the filter screens, out of the conduit via the mount upper part. The filter elements are designed differently, according to the particular intended use, in terms of the type, extent and distribution of the throughflow orifices; alternating arrangements have proved especially expedient.

However, considerable difficulties in filtering out sewage by means of such a known conveyor-band filter apparatus arise when the material to be filtered out has mixed in it relatively coarse solid fragments, such as stones, pieces of wood or the like, which slide off from the filter elements conveying the filtered material and fall back into the conduit or which cannot even be picked up at all. They remain in the conduit and impede the mechanical cleansing to an increasing extent, so that they constantly have to be removed by means of appropriate aids. A continuous mode of operation of the conveyor-band filter apparatus is no longer guaranteed in the case of sewage laden in this way; stoppage times and a high labor outlay are the inevitable consequences.

A filter apparatus having filter elements fastened to a rotating chain drive is known from DE-A-4 200 366. These filter elements are each pivotably fastened at one end to the chain drive and in each case rest with their other end against one another, so that, in the deflecting region, the filter elements are pivotable relative to one another and relative to the chain drive. The ends of these sheet-like filter elements are made comb-shaped and are angularly bent.

The object of the invention is, therefore, to provide a conveyor-band filter apparatus of the type initially designated in more detail, in such a way that the filtration of flowing liquids contaminated with solids is not impeded by coarse solid fragments carried along with the liquids or deposited so as to rest in the conduit and, during the operating of the conveyor-band filter apparatus, these solid fragments are constantly discharged together with the remaining fine-grained filtered material.

SUMMARY OF THE INVENTION

Conveyor-band filter apparatuses, so-called Paternoster filter rakes, which serve primarily for the mechanical cleansing of flowing sewage, are to be made capable by the invention of removing not only the normal filtered material, but also coarser fragments, from the conduit through which the sewage flows, without the usually steep conveying angle having to be varied; for this purpose, filter elements of the endless filter band are arranged in each case on the chain links and are designed on their end faces in such a way that only a small gap remains even in the state in which they are mutually pivoted relative to one another. Furthermore, attached to the filter elements are filter rakes forming a horizontal lifting face which extends transversely through the conduit and which can nevertheless be kept clean by corresponding stripping devices.

While fine-grained filtration material is being conveyed out of the conduit by the filter elements themselves, stones, pieces of wood and such like coarse solid fragments can now be transported away simultaneously and mechanically, without the work of the conveyor-band filter apparatus having to be interrupted. This ensures a filtration which works without interventions for a long time and which requires no special precautions or an additional precleansing of coarse solid fragments and can therefore be used universally. As a result of the special design of the filter elements, on the one hand filtration is highly effective and, on the other hand, the filtration material can be removed again, for example by brushes, at a low energy outlay. It is especially advantageous if the active surface of the filter element is made convex with a radius of curvature which corresponds to the spacing relative to the axis of the chain wheel.

The longitudinal edges of the filter elements and the filter rakes expediently in each case extend transversely to the direction of flow of the liquid to be filtered and approximately horizontally, while, during operation, the conveyor-band filter apparatus can be set up so that a main axis connecting the axes of the deflecting elements is inclined at an acute conveying angle to the vertical, so that the frame mount is in fact arranged at an inclination during operation and the filtration material cannot slide off from the filter elements during conveyance.

Irrespective of this, the arrangement can be such that the lifting faces form an angle of inclination of between 0° and 30° with a normal to the main axis. In this way, it is possible, by coordinating the angle of inclination with the conveying angle, to ensure that the lifting faces are always oriented so that the filtered material resting on them cannot be flushed off or fall down during conveyance.

The conveyor-band filter apparatus can be designed in a simple way if, during conveyance, the rake tines are directed opposite to the direction of flow of the liquid and thus match the remaining filter element without constraint.

Smooth deflecting rollers or chain wheels can be provided as lower deflecting elements. In both embodiments, it is expedient if the deflecting elements are designed so that the rectilinear upward and downward movements of the filter elements are parallel to one another.

The filter band consisting of the filter elements is formed in a simple way, in that the articulation bearings provided in each case for two parallel axes of articulation are formed at the ends of the chain links.

The filter elements are adapted to the high loads caused by possibly very heavy solid fragments resting on the lifting surfaces, if the end faces are angled at the longitudinal edges of the filter elements, and furthermore if the side faces are angled on the filter elements and the end faces are fixedly connected to the side faces, expediently in such a way that, during the operation of the filter band, the end faces and/or side faces point in the direction of the main axis, so that they are bent in the direction of flow and do not impede subsequent falling or stripping of the filtration material from the filter band.

A constantly closed surface of the conveyor-band filter apparatus can be achieved with a high degree of reliability in that the end faces are plane, at least in part, and projecting edges aligned with the axes of articulation are formed on them in each case, in such a way that two mutually projecting end faces of adjacent filter elements, at these projecting edges, both during the rectilinear movement and during the deflection of these filter elements, are continually at an approximately constantly short spacing which does not allow the filtration material to pass in the direction of flow. Filtration thereby takes place virtually completely, despite the filter elements connected in an articulated manner.

In particular, it is also advantageous for this purpose if the projecting edges are formed in each case by a bending of the end faces which is parallel to the longitudinal edges, at best if the part faces formed by the bending of an end face form an obtuse, preferably approximately right bending angle, the end faces and/or the side faces advantageously being designed so that they complete the sheet-like filter elements to form three-dimensional filter baskets which are open towards the main axis and which at the same time have a triangular cross section broken by the bends. Such a filter basket can be made exceptionally dimensionally stable and nevertheless at the same time relatively light. In order to obtain an approximately triangular cross section of this type, it is expedient if there is provided a first end face which is higher than the other and on which or in the vicinity of which the filter rake is provided on the filter element. The introduction of force accordingly takes place in the region of the highest moment of resistance.

In order to guarantee that the filter rakes are sealed off in the region of the floor of the conduit, a sealing device sealing off the filter rakes is provided on the frame mount transversely to the direction of flow. There can be provided on it elastic stripping elements which engage, for example in the form of a brush, into the gaps between the rake tines of the particular filter rake moved through the stripping device.

Because of the often enormous width of the conveyor-band filter apparatus, there is the risk that, during conveyance, the wide filter elements will sag under the load arising from the laden filter rakes. This can be allowed for by arranging the drawn strand of the filter band so as to rest slidably on at least one base retained fixedly on the frame mount, the base advantageously consisting of bearing rails provided parallel to the conveying direction of the filter elements. The arrangement is made possible particularly in that side cheeks are located on the frame mount on both sides of the filter band. The base can be attached to horizontal crossmembers which are fastened laterally to the frame mount, especially to its side cheeks. However, if appropriate, safety precautions are also necessary for the filter elements themselves, so that they can transmit even high loads to the base without damage; it may therefore be advantageous if sliding pieces stiffening the filter elements and resting on the base are provided on these.

There serves primarily for cleaning the filter band a rotating brush arranged above the latter. The cleaning of the filter band is further improved if there is provided on the upper mount part a second stripping device which removes from the filter band undiscarded filtration material adhering to the filter elements, and once again a brush can be provided as the stripping element.

Uniform operation is guaranteed if a filter rake is provided on each of the filter elements or at least if a filter rake is provided on part of each of the filter elements, preferably with the same division as the filter band. Manufacture and assembly are made easier if the filter elements are provided on the filter band differently or alternately in terms of the type, extent and distribution of the throughflow orifices and if a filter rake is in each case provided on the same filter elements.

An especially advantageous version of the invention is defined in that the end faces of the filter elements are designed as filtration-active parts, so that the total area of the filter elements which is available for filtration is appreciably increased.

In general, the conveyor-band filter apparatus according to the invention allows a continuous operation which is not constantly interrupted by coarse filtration material which causes obstructions and which cannot be conveyed out; on the contrary, the arrangement is now ready for all filter tasks which occur in practice.

BRIEF DESCRIPTION OF THE DRAWINGS

The invention is explained in more detail below by means of the drawing with reference to an exemplary embodiment. In the drawing:

FIG. 2 shows a detail A from FIG. 1, FIG. 3 shows a side view of a filter element according to the invention, FIG. 4 shows a section B—B from FIG. 3, shown entirely in a diagrammatically simplifying representation.

DETAILED DESCRIPTION

Figure 1:
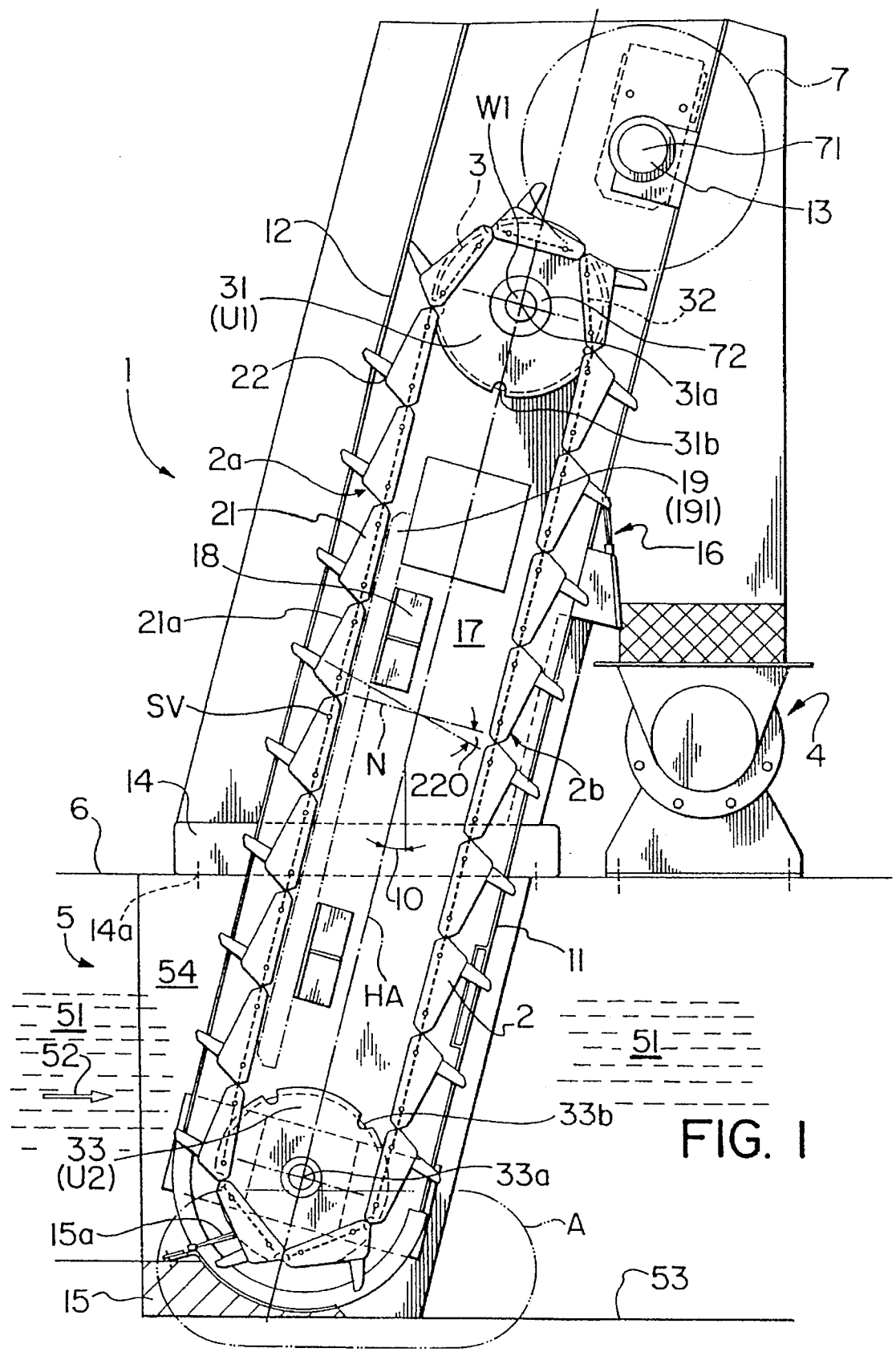
FIG. 1 shows a side view of a conveyor-band filter apparatus according to the invention in operation.

According to FIG. 1, a conveyor-band filter apparatus according to the invention consists essentially of a frame mount 1, a filter band 2 guided on the frame mount 1, a chain drive 3 connected to the frame mount 1 and to the filter band 2 and a filtered material discharge 4. The filter apparatus is provided for the cleansing of a conduit 5 which extends below ground level 6.

A solid-laden liquid 51 flows through the conduit 5 in a direction of flow 52 illustrated by a directional arrow, and the conduit 5 can extend over a considerable width perpendicularly to the paper plane of FIG. 4. The conveyor-band filter apparatus reaches as far as a floor 53, so that the entire flow cross section of the conduit 5 is shut off transversely to the direction of flow 52, so that the liquid 51 has to pass through the part of the conveyor-band filter apparatus located in the conduit 5.

The frame mount 1 consists of a lower mount part 11, forming the part through which the liquid 51 is to pass, and of an upper mount part 12 which is located outside the conduit 5 and which serves for mounting an electromotive drive 72 fastened to a shaft W1. Provided between the mount parts 11 and 12 is a connecting frame 14, by means of which the frame mount 1 is detained fixedly on both sides of the conduit 5, for example by means of anchor bolts 14a cemented in on the side walls 54 of the conduit 5. The mount parts 11 and 12 are connected to the connecting frame 14 in such a way that the frame mount 1 is arranged at an inclination to the vertical by an acute conveying angle 10 when the ground level 6 extends approximately horizontally. The conveying angle 10 is preferably 15° to the vertical, but can also be made up to 30°. The conveying angle 10 is represented as invariable in the drawing; however, instead, it is also possible to make the frame mount 1 pivotable on the connecting frame 14.

The drive 72 drives chain wheels or sprockets 31 which form a first deflecting element U1 for a drive chain 32 of a chain drive 3 and which are mounted for rotation about an axis 31a of the shaft W1 on the mount part 12. The first deflecting elements U1, on each of which a drive chain 32 is deflected or guided through 180°, are provided on the associated shaft W1 on both sides of the filter band 2. As a rule, both deflecting elements U1 are designed as chain wheels or sprockets 31, so that the drive chains 32 are driven synchronously on both sides of the filter band 2.

Second deflecting elements U2 are provided in the same way on the mount part 11 on a fixedly mounted shaft U2. In the drawing, these deflecting elements U2 are likewise designed as chain wheels or sprockets 33, but simple deflecting or guiding rollers are also sufficient here under certain circumstances. The theoretical connection of the axis 33a of the chain wheels 33 to the axis 31a of the chain wheels 31 forms a main axis HA of the conveyor-band filter apparatus in its side view shown in FIG. 1.

The two deflecting elements U1, U2 can easily be identified in FIG. 1 as chain wheels 31, 33, since the necessary articulation sockets 31b, 33b cooperating with articulation pins 34 (FIG. 2) of the drive chain 32 can be seen clearly. Their axial spacings AK are equal to the axial spacings AG of the articulation pins 34. In contrast, the chain links 320 of the drive chain 32 are not shown in FIG. 1, in order to preserve clarity; however, they can readily be seen in FIG. 2 as simple plates extending between the articulation pins 34.

Fastened to each of the chain links 320 on their "inner" side 320a is a filter element 21 which extends over the entire width with its horizontal longitudinal edges essentially perpendicularly to the paper plane between the drive chains 32 laterally encasing the filter band 2. Two screw connections SV indicated in FIGS. 1 and 2 are provided in each case for fastening the chain links 320 to the filter elements 21; associated passage bores 21b are marked in FIG. 3.

The filter elements 21 are made approximately triangular in cross section and are each shaped by means of end and side faces to form filter baskets 21', the necessary filter orifices being provided in the sheet-like filter elements 21. A first higher end face 21c (FIG. 3) is bent out of the filter element 21 and, by means of a secondary stiffening bend, is designed so that a projecting edge 21d is obtained. A further projecting edge 21f is located in a similar way in a second end face 21e; the two projecting edges 21d, 21f are placed on the filter baskets 21' in such a way that they are in alignment with the axes of articulation 34a associated with the articulation pins 34 and are spaced slightly from one another. This ensures that the slit-shaped spacing which thus remains stays constant, irrespective of the relative pivoting of two filter elements 21 in relation to one another. The side faces 21g illustrate the approximately triangular cross section of the filter baskets 21'. They are materially connected to the adjacent end faces 21c, 21e. The end faces 21c, 21e are designed as filter faces.

Figure 5:
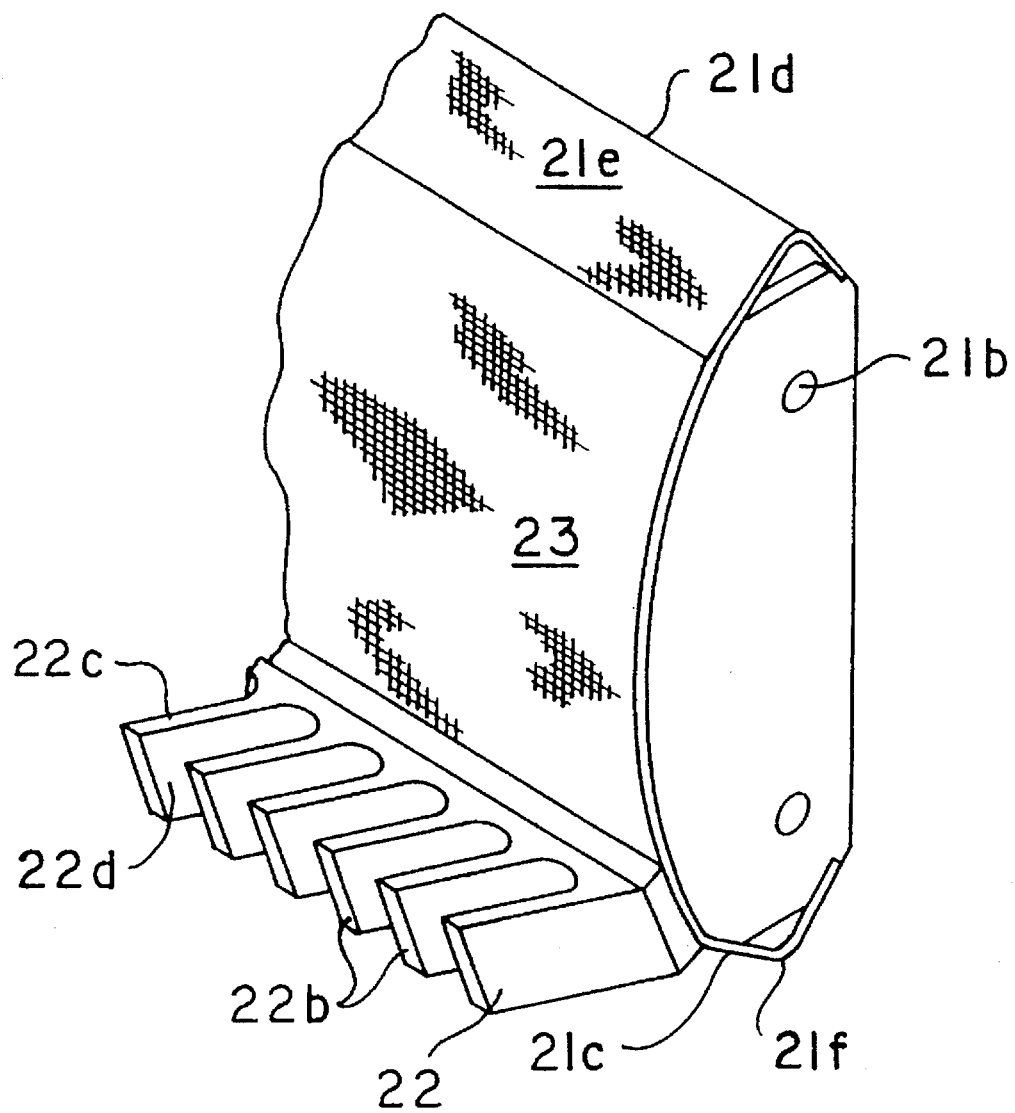
FIG. 5 is a perspective view of a further embodiment of the filter element according to the invention.

An especially advantageous design of the filter element 21 is illustrated in FIG. 5. This filter element has convexly curved screen face 23 having a radius of curvature which corresponds to the spacing of the screen face 23 relative to the axis 31a of the upper chain wheel 31. The end faces 21e and 21c are designed according to the exemplary embodiment shown in FIG. 3. The projecting edges 21d and 21f are likewise aligned with the axes of articulation 34a of the chain links.

In the region of the filter elements which is in each case at the bottom during the upward movement of the filter elements, filter rakes 22, the lifting faces 22c of which are designed according to those shown in FIG. 3, are attached to the filter elements. The advantage of this design is that, during the operation of brushing off the accumulated filtered material, a rotating brush can work all the faces of the filter element with the same pressing force, and that this can be achieved more effectively, while at the same time ensuring low brush wear.

In FIG. 1, the filter band 2 consists of a multiplicity of identical filter elements 21 which cannot be differentiated in the drawing. In fact, however, it is possible to provide different filter elements 21 which, as already stated above, are differentiated particularly by means of the cross section and the arrangement and number of filter orifices located in them. Here, however, their cross section is made uniform.

Filter rakes 22 are fastened, for example welded, to the filter baskets 21'. They consist of a unitary base part 22a and a multiplicity of rake tines 22b, extend over the entire width of the particular filter basket 21' and are provided on the filter element 21 on the same side as the higher end face 21e; at the same time, the filter basket 21' is inserted into the filter band 2 in such a way that, on the drawn strand 2a of the filter band 2, this end face 21e is at the bottom on the filter basket 21' and, at the same time, a lifting face 22c serving for picking up coarse solid fragments is formed by the rake tines 22b. The lifting face 22c, horizontal over the width of the conduit 5, forms an angle of inclination 220 of 15° with a normal N to the main axis HA, said normal N being marked in FIG. 1, so that, here, the lifting face 22c is inclined at 30° to the horizontal and filtered material can be reliably conveyed.

A rotating brush 7 serves for stripping off the raked out material conveyed out of the liquid and is driven by a drive 13 fastened on the shaft 71. This brush is arranged above the filter band 2 in such a way that the faces covered by the brush each lie flat during the stripping. As can be seen by reference to FIG. 1, brush 7 has a center axis offset from the elongated axis of the filter band 2. The brush 7 is adjustably fitted to the frame so its axis can be repositioned.

A second stripping device 16, fastened to the mount part 12, is located on the loose strand 2b for removing the filtered material still adhering to the filter band 2 into the filtered material discharge 4 for transporting away the filtered material.

A sealing device 15 is provided adjacent the floor 53 of the conduit 5 so as to the limit liquid flow under the filter elements 21. Device 15 includes a sealing device 15b attached to the frame mount 1 adjacent the conduit floor 53 for sealing off the filter racks 22. Device 15b can take the form of elastic stripping elements which engage the inter-tine gaps 22d formed in the rack 22 in a brush-like manner.

The frame mount 1 is provided, parallel to the side walls 54 of the conduit 5, with side cheeks 17, to which a plurality of horizontal crossmembers 18 guided through the entire conduit 5 are attached. The crossmembers 18 serve as supports for a base 19 which consists of a number of parallel bearing rails 191 for the filter baskets 21', so that, even under a high load, these cannot sag. Sliding pieces 21h can be attached to the filter baskets 21' in the region of the bearing rails 191, in order to reduce the sagging and the surface pressure.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A conveyor-band filter apparatus for the mechanical cleansing of a liquid flowing in a conduit or the like and contaminated with solids, for filtering material from the liquid, said apparatus comprising:

(a) an endless filter band consisting of interconnected filter elements each displaceable relative to the other about a horizontal axis of articulation wherein, said filter band includes a first end disposed in the conduit and a second end located outside of the conduit and an elongated axis extending between said filter band ends and said filter elements are configured to allow liquid to flow therethrough and to trap filtered material for removal from the liquid;

(b) drive means located on both said ends of said filter band, said drive means including a chain drive with deflecting elements and two parallel, endless drive chains, coupled over said chain drive deflecting elements, each said drive chain being formed from a plurality of chain links that are connected together around said filter element axes of articulation wherein, said filter elements forming said filter band are rigidly fastened to said chain links to extend between parallel chain links; and (c) a frame mount which carries said chain drive deflecting elements and said filter band, said frame mount having an upper mount part which remains outside the conduit and to which at least one drive motor for said drive means is fastened at a location where filtered material removed from the liquid is discharged, wherein, each said filter element is formed with an outer face and opposed end faces, each said end face being inwardly directed from said outer face towards said filter band elongated axis and defining a filter element projecting edge, said end faces being dimensioned so that said filter element projecting edges are located adjacent said filter element axes of articulation so that said projecting edges of adjacent said filter elements are located across said filter element axis of articulation around which said filter elmeents are disposed, and wherein at least one filter rake having a plurality of rake tines is fastened to at least one of the filter elements.

2. The conveyor-band filter apparatus as claimed in claim 1, wherein said chain drive deflecting elements include lower and upper rotating chain wheels, each said chain wheel having an axis about which said chain wheel rotates and said filter element outer faces are convexly curved and are shaped to have a radius of curvature centered about said axis of said upper chain wheel when said filter elements are positioned against said upper chain wheel.

3. The conveyor-band filter apparatus as claimed in claim 1, wherein said filter rake extends outwardly from said filter element to which said filter rake is attached so as to have an inclination of between 0° and 30° relative to a horizontal axis established by the flowing liquid.

4. The conveyor-band filter apparatus as claimed in claim 1, wherein said drive means chain drive includes smooth deflecting rollers or chain wheels positioned against said filter band at said first end of said filter band.

5. The conveyor-band filter apparatus as claimed in claim 1, wherein said filter element projecting edges are defined by bending said filter element end faces.

6. The conveyor-band filter apparatus as claimed in claim 5, wherein each said filter element is provided with opposed side plates positioned to form three-dimensional filter baskets with said filter element, said baskets formed by said filter elements and said side plates being open towards a direction from which the flowing liquid originates.

7. The conveyor-band filter apparatus as claimed in claim 1, further including a first sealing device for cleaning said filter rake, said first sealing device including brushes provided adjacent the floor of the conduit, said brushes being attached to said frame mount.

8. The conveyor-band filter apparatus as claimed in claim 7, wherein said first sealing device brushes are formed from elastic stripping elements which engage into gaps between rake tines of said filter rake.

9. The conveyor-band filter apparatus as claimed in claim 1, wherein said filter band has a drawn section that is pulled upwardly from the conduit and said filter band drawn section is arranged to rest slidably on at least one base which is fixedly secured on said frame mount, said base consisting of bearing rails provided parallel to the conveying direction of the filter elements.

10. The conveyor-band filter apparatus as claimed in claim 9, wherein each said filter element is provided with a sliding piece which stiffens said filter element and which rests on said base of said frame mount.

11. The conveyor-band filter apparatus as claimed in claim 1, wherein a rotatable stripping element is attached to said frame mount part adjacent said upper mount and is positioned to abut said second end of said filter band.

12. The conveyor-band filter apparatus as claimed in claim 11, wherein said stripping element has an axis that is offset laterally relative to said filter band elongated axis and is adjustable relative to said filter band elongated axis.

13. The conveyor-band filter apparatus as claimed in claim 11, wherein said stripping element is a brush.

14. The conveyor-band filter apparatus as claimed in claim 11, wherein there is provided on said upper mount part of said frame mount a second stripping device which removes from said filter band undiscarded filtered material adhering to said filter elements.

15. The conveyor-band filter apparatus as claimed in claim 14, wherein a brush is provided as said second stripping device.

16. The conveyor-band filter apparatus as claimed in claim 1, wherein a filter rake is provided on each of said filter elements.

17. The conveyor-band filter apparatus as claimed in claim 1, wherein said filter element end faces are designed as filtration-active parts.

18. A conveyor-band filter assembly for cleaning liquid flowing through a conduit, the conduit having a floor, said assembly including:

a frame mount positioned to extend above the conduit;

lower and upper rotating chain wheels, said lower chain wheel being located in said the conduit adjacent the conduit floor, said upper chain wheel being attached to said frame mount above said conduit, each said chain wheel being configured to receive two spaced apart endless chains and a drive unit attached to said upper chain wheel;

two endless chains disposed over said chain wheels so as to be rotated by said chain wheels around an elongated filter band axis, each said endless chain being formed by a plurality of interconnected chain links wherein, said chain links forming each said endless chain are aligned with each other so as to define articulation axes that extend between said endless chains substantially horizontally across the conduit; and a plurality of filter units, each said filter unit extending across opposed chain links, each said filter unit including:

two side plates, each said side plate being attached to an inner side of one of said chain links;

a filter element secured between said side plates so as to extend therebetween, said filter element being configured to allow liquid flow therethrough and to remove material from the liquid and being shaped to have a main face that extends substantially across said side plates and opposed end faces integral with said main face, each said end face extending between said side plates and being directed inwardly relative to said main face towards said filter band axis and defining a filter element projecting edge positioned to be located adjacent said axis of articulation associated with said chain links with which said filter element is associated so that filter element projecting edges of adjacent said filter units are located adjacent said axis of articulation that is between said filter units; and a filter rake attached to a lower surface of each said filter element.

19. The conveyor-band filter assembly of claim 18, wherein said filter element main faces are formed to have outwardly curved profiles.

20. The conveyor band-filter assembly of claim 18, wherein said filter unit side plates extend between said axes of articulation associated with said chain links to which said filter units are attached and said side plates are attached to said chain links at locations spaced inwardly from said axes of articulation.

21. The conveyor-band filter assembly of claim 20, wherein said filter element end faces are bent inwardly around said side plates to define said filter element projecting edges and each said end face has an end section distal from said filter element main face and said filter element end face end sections are attached to said associated filter unit side plates.

22. The conveyor-band filter assembly of claim 18, wherein said filter element end faces are bent inwardly around said side plates to define said filter element projecting edges and each said end face has an end section distal from said filter element main face and said filter element end face end sections are attached to said associated filter unit side plates.

23. The conveyor-band filter assembly of claim 18, wherein each said filter element is formed so that said filter element projecting edges are spaced away from said side plates.

* * * * *

UNITED STATES PATENT AND TRADEMARK OFFICE
CERTIFICATE OF CORRECTION

PATENT NO. : 5,565,093
DATED : October 15, 1996
INVENTOR(S) : Dieter FRANKENBERGER It is certified that error appears in the above-indentified patent and that said Letters Patent is hereby corrected as shown below:

```
Column 8, line 35; delete "part"; and
                   after "upper mount" insert
                   ---part---.
```

Signed and Sealed this

Tenth Day of June, 1997

Attest:

BRUCE LEHMAN

Attesting Officer

Commissioner of Patents and Trademarks